US009382887B2

(12) United States Patent
Clark et al.

(10) Patent No.: US 9,382,887 B2
(45) Date of Patent: Jul. 5, 2016

(54) ENGINE COMPONENT SEAL ASSEMBLY AND METHOD OF SEALING A COOLANT PASSAGE FROM AN ENGINE COMPONENT

(75) Inventors: Kent H. Clark, Panama, NY (US); Glen T. Haegele, Columbus, IN (US); Nathan E. Coulombe, Greenwood, IN (US); Matthew R. Walker, Jamestown, NY (US); John M. Nyvall, Columbus, IN (US); Jeffrey J. Hurd, Columbus, IN (US); Andrew J. Keenan, Columbus, IN (US); Dustin J. Hall, Columbus, IN (US); Brendan J. O'Grady, Ada, MI (US)

(73) Assignee: Cummins Intellectual Property. Inc., Minneapolis, MN (US)

( * ) Notice: Subject to any disclaimer, the term of this patent is extended or adjusted under 35 U.S.C. 154(b) by 262 days.

(21) Appl. No.: 13/558,159

(22) Filed: Jul. 25, 2012

(65) Prior Publication Data

US 2013/0133603 A1 May 30, 2013

Related U.S. Application Data

(63) Continuation-in-part of application No. 12/888,760, filed on Sep. 23, 2010, now Pat. No. 8,230,838.

(60) Provisional application No. 61/245,081, filed on Sep. 23, 2009.

(51) Int. Cl.
| | |
|---|---|
| *F02M 61/14* | (2006.01) |
| *F02M 61/10* | (2006.01) |
| *F02B 77/00* | (2006.01) |
| *F02F 1/24* | (2006.01) |
| *F16J 15/06* | (2006.01) |
| *F01P 3/12* | (2006.01) |
| *F02M 53/04* | (2006.01) |

(52) U.S. Cl.
CPC ............... *F02M 61/14* (2013.01); *F02B 77/00* (2013.01); *F02F 1/242* (2013.01); *F02M 61/10* (2013.01);

(Continued)

(58) Field of Classification Search
CPC ..... F02M 61/10; F02M 61/14; F02M 61/145; F02M 2200/853; F02M 2200/856; F02M 2200/857; F02P 3/12
USPC ................ 123/470, 41.31, 541, 143 C, 143 R
See application file for complete search history.

(56) References Cited

U.S. PATENT DOCUMENTS

| 3,334,617 A | 8/1967 | Palkowsky |
|---|---|---|
| 4,043,160 A | 8/1977 | Baker et al. |

(Continued)

FOREIGN PATENT DOCUMENTS

| JP | S59-184366 U | 12/1984 |
|---|---|---|
| JP | 2000-170627 A | 6/2000 |

OTHER PUBLICATIONS

The International Search Report and the Written Opinion of the International Searching Authority with mailing date of Apr. 28, 2011; International Application No. PCT/US2010/049960.

*Primary Examiner* — Mahmoud Gimie
(74) *Attorney, Agent, or Firm* — Faegre Baker Daniels LLP (57) ABSTRACT

An engine component seal assembly and method of sealing a coolant passage from an engine component are provided. The seal assembly includes a sealing sleeve sized and dimensioned to slip fit into an engine component mounting bore and a retaining ring sized and dimensioned to be axially inserted into the sleeve. The ring contacts the sleeve and applies a radial force sufficient to create an interference fit and to move or yield an interface portion of the sleeve radially outward into sealing abutment against a wall forming the mounting bore to create a secure and reliable annular fluid seal.

24 Claims, 5 Drawing Sheets

(52) U.S. Cl.
CPC ............ *F02M 61/145* (2013.01); *F16J 15/061* (2013.01); *F01P 3/12* (2013.01); *F02M 53/043* (2013.01); *F02M 2200/853* (2013.01); *F02M 2200/856* (2013.01); *F02M 2200/857* (2013.01); *F02M 2200/858* (2013.01); *Y10T 29/49231* (2015.01)

(56) References Cited

U.S. PATENT DOCUMENTS

| | | |
|---|---|---|
| 5,195,362 A | 3/1993 | Eason |
| 5,345,913 A | 9/1994 | Belshaw et al. |
| 6,053,432 A | 4/2000 | Stevens |
| 6,112,722 A * | 9/2000 | Barnhart et al. ............... 123/470 |
| 6,119,658 A | 9/2000 | Jehle et al. |
| 6,279,516 B1 | 8/2001 | Haugen et al. |
| 6,481,421 B1 | 11/2002 | Reiter |
| 6,866,026 B2 | 3/2005 | Mickelson |
| 6,892,707 B2 | 5/2005 | Reiter et al. |
| 7,028,918 B2 | 4/2006 | Buchanan et al. |
| 7,261,089 B2 | 8/2007 | Hoenig et al. |
| 7,281,521 B2 * | 10/2007 | Neumaier ..................... 123/470 |
| 2001/0015601 A1 | 8/2001 | Henkel |
| 2004/0060544 A1 | 4/2004 | Reiter et al. |
| 2008/0271713 A1 | 11/2008 | Morris |
| 2009/0085304 A1* | 4/2009 | Miyashita et al. ............. 277/591 |
| 2010/0175668 A1* | 7/2010 | Chern et al. .................. 123/470 |

\* cited by examiner

ENGINE COMPONENT SEAL ASSEMBLY AND METHOD OF SEALING A COOLANT PASSAGE FROM AN ENGINE COMPONENT

TECHNICAL FIELD

This disclosure relate to the sealing of a coolant passage from an engine component for an internal combustion engine.

BACKGROUND

An internal combustion engine includes an engine body and engine components, such as a fuel injector, spark plug, pressure sensor, mounted on the engine body. The engine body also includes one or more engine coolant passages containing engine coolant in close proximity to the engine components. For example, engines often require a separate injector sleeve insert to separate coolant from the fuel injector. Many designs for injector sleeve insertion exist with varying degrees of robustness against coolant, fuel, and combustion gas, leaks, particularly at the end closest to the combustion event, i.e. the combustion chamber. The high local temperatures make elastomeric sealing a challenge. Also, high mechanical and thermal load cycling may create high stress at the sleeve/head seal interface. Various conventional sleeve and cylinder head designs possess various complexities in the cylinder head to satisfy long term cylinder head durability requirements, and these complexities sometimes involve expensive details requiring tight tolerance and process controls.

SUMMARY

The disclosure includes an injector seal assembly for insertion in an engine component mounting bore formed in a portion of an engine, comprising a sealing sleeve including an outer surface sized and dimensioned to be positionable in the mounting bore adjacent a bore sealing surface. The sealing sleeve further includes an inner surface and a ring interface portion. The inner surface at the interface portion has an inner radial extent. The seal assembly also includes a retaining ring sized and dimensioned to be positionable within the sleeve adjacent the ring interface portion. The retaining ring has an outer annular surface with an outer radial extent greater than the inner radial extent of the inner surface at the interface portion of the sealing sleeve to apply a radially outward sealing force against the interface portion to create a fluid seal between the sealing sleeve and the bore sealing surface.

The outer surface of the sealing sleeve may be sized and dimensioned to not form a fluid seal against the bore sealing surface without the radially outward sealing force. The sealing sleeve may be formed of a first material and the retaining ring may be formed of a second material different than the first material. The first material may be resistant to corrosion. The second material may have thermal expansion characteristics at least comparable to a material forming the portion of the engine. The outer surface of the sealing sleeve at the interface portion may be devoid of one or more grooves. The sealing sleeve may be an annular groove formed in the outer surface and positioned at a spaced axial distance from the interface portion. The interface portion may have a radial width greater than a portion of the sealing sleeve adjacent the interface portion. The retaining ring includes a predetermined axial extent along the longitudinal axis to position the engine component in a predetermined axial position relative to the mounting bore.

The disclosure also includes a method of sealing a coolant passage from an engine component, comprising an engine component mounting bore, providing a coolant passage in communication with the mounting bore, positioning a sealing sleeve in the mounting bore, positioning a retaining ring in the mounting bore and within the sleeve, and applying an axial force to the retaining ring to cause the retaining ring to apply a radial force against the sealing sleeve to cause the sealing sleeve to sealingly abut a sealing surface in the mounting bore to create a fluid seal between the sealing sleeve and the sealing surface to seal a portion of the coolant passage from the mounting bore. The method may further include inserting an engine component into the mounting bore and the sealing sleeve while maintaining the retaining ring in the sealing sleeve. The sealing sleeve may include an interface portion having an outer surface to sealingly abut the sealing surface. The positioning of the sealing sleeve in the mounting bore may not form a fluid seal between the outer surface of the interface portion and the sealing surface. The engine component may be a spark plug. The retaining ring may include a predetermined axial extent along the longitudinal axis to position the spark plug in a predetermined axial position relative to the mounting bore. The sealing sleeve may include an interface portion having an outer surface to sealingly abut the sealing surface, wherein the positioning of the sealing sleeve in the mounting bore does not form a fluid seal between the outer surface of the interface portion and the sealing surface.

The disclosure also includes an engine comprising an engine component mounting bore including a sealing surface, a sealing sleeve positioned in the mounting bore, a retaining ring mounted in the sealing sleeve and sized to apply a radially outward sealing force against the sealing sleeve to create a fluid seal between the sealing sleeve and the sealing surface, and a spark plug mounted in the mounted bore adjacent the retaining ring. The sealing sleeve may include an inner sleeve surface having an inner radial extent. The retaining ring may have an outer ring surface with an outer radial extent greater than the inner radial extent of the inner sleeve surface of the sealing sleeve to create an interference fit. The engine may further include a coolant passage in communication with the mounting bore, and an annular seal positioned between the sealing sleeve and the sealing surface. The sealing sleeve may include an interface portion in contact with the retaining ring. The coolant passage may be positioned axially along the spark plug between the interface portion and the annular seal. The sealing sleeve may include an interface portion in contact with the retaining ring. The interface portion may have a radial width greater than a portion of the sealing sleeve adjacent the interface portion. The engine may further include a coolant passage in communication with the mounting bore. The fluid seal may fluidically seal a portion of the coolant passage from the mounting bore. The retaining ring may include a predetermined axial extent along the longitudinal axis to position the spark plug in a predetermined axial position relative to the mounting bore. The retaining ring may further includes a transverse surface extending transversely relative to the longitudinal axis, further including an annular spark plug seal positioned axially between the spark plug and the transverse surface to create a fluid seal. The retaining ring may include a center bore to receive the spark plug and an inner surface positioned adjacent the spark plug, wherein the inner surface includes a radial extent sized to permit the spark plug to be slidingly received within the center bore without forming a fluid seal between the inner surface and the spark plug. The engine body may further include a connection portion formed adjacent to and extending around the mounting bore. The spark plug may include a securing portion positioned to engage the connection portion to secure the spark plug in the mounting bore. The connection portion may be positioned axially between a distal end of the spark plug and the retaining ring.

DETAILED DESCRIPTION

An exemplary embodiment of the sealing assembly, indicated generally at 10 in FIGS. 3a-3d, includes an expansion or retaining ring 12 and a sealing sleeve 14 for positioning in an engine component mounting bore 16 formed in a portion, i.e. cylinder head, 18 of an engine body of an internal combustion engine, such as a diesel, spark-ignited, or multi-mode engine. Cylinder head 18 includes a coolant passage 32 in communication with or fluidly connected to mounting bore 16 prior to insertion of seal assembly 10. Coolant passage 32 is simply, easily and reliably fluidly sealed from the mounting bore to isolate the coolant from the engine component by insertion of seal assembly of 10. Sealing assembly 10 provides a metal to metal combustion deck side seal with contact pressures high enough to yield sealing sleeve 14 into sealing abutment against the opposing surface 36 of the engine forming engine component mounting bore 16, and then maintain that contact pressure without requiring augmentation from the engine component mounting or securement system. That is, the engine component, e.g. injector 19 or a spark plug or other component such as a sensor, clamping or securing load, for securing the engine component in mounting bore 16, is not relied upon to apply a sealing force to sealing sleeve 14.

Figure 1:
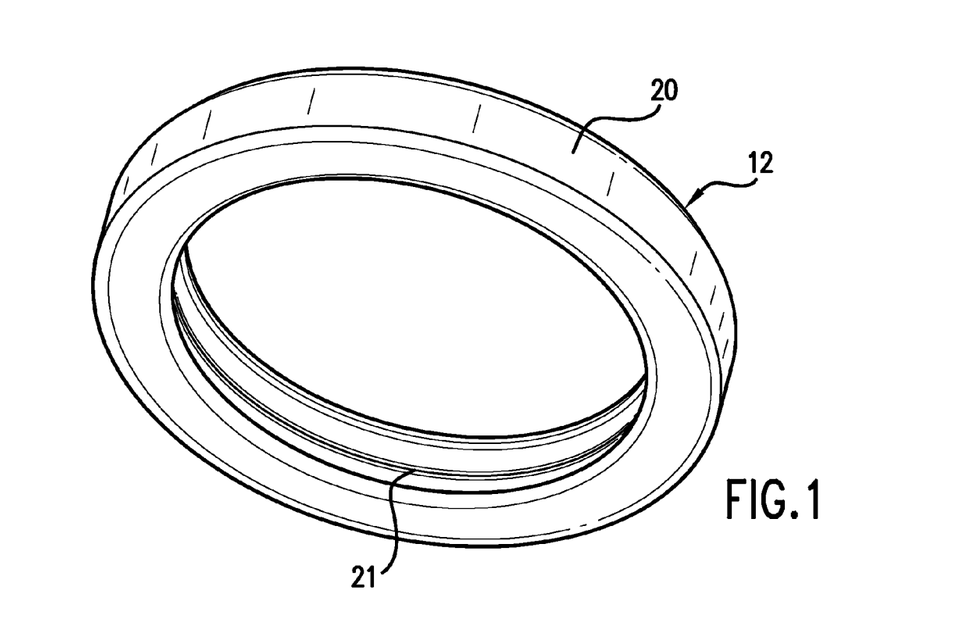
FIG. 1 is a perspective view of an exemplary embodiment of the retaining ring of the seal assembly.

Referring to FIG. 1, retaining ring 12 is sized, dimensioned, and formed of an appropriate material, so that simply by pressing the ring into position, a high sealing interface pressure is created between sealing sleeve 14 and surface 36 of mounting bore 16. Retaining ring 12 is circular in shape with a hollow center, i.e. center bore, and includes an outer annular surface 20 for contacting sealing sleeve 14. In the exemplary embodiment of FIG. 1, outer annular surface 20 is generally a continuous curved surface free of grooves. In other embodiments, outer annular surface 20 may have grooves or projections so long as the outermost annular surface contacts sealing sleeve 14 sufficiently around the sleeve's inner circumference to apply sufficient radial pressure or force to the sleeve to create a complete fluid seal between sealing sleeve 14 and cylinder head 18 around the entire circumference of sleeve 14. Retaining ring 12 also includes a feature to allow removal of ring 12 during a potential reconditioning event. The removal feature is preferably an annular groove 21 formed on the inner surface of ring 12 forming its center bore, but two or more spaced depressions may be used, for grasping by a tool.

Figure 2:
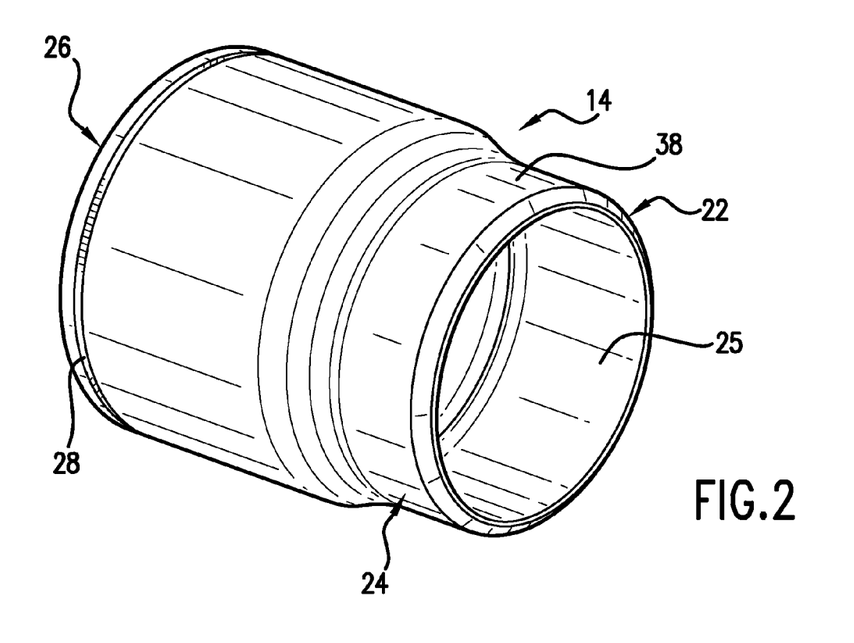
FIG. 2 is a perspective view of an exemplary embodiment of the sealing sleeve of the seal assembly.
Figure 3A:
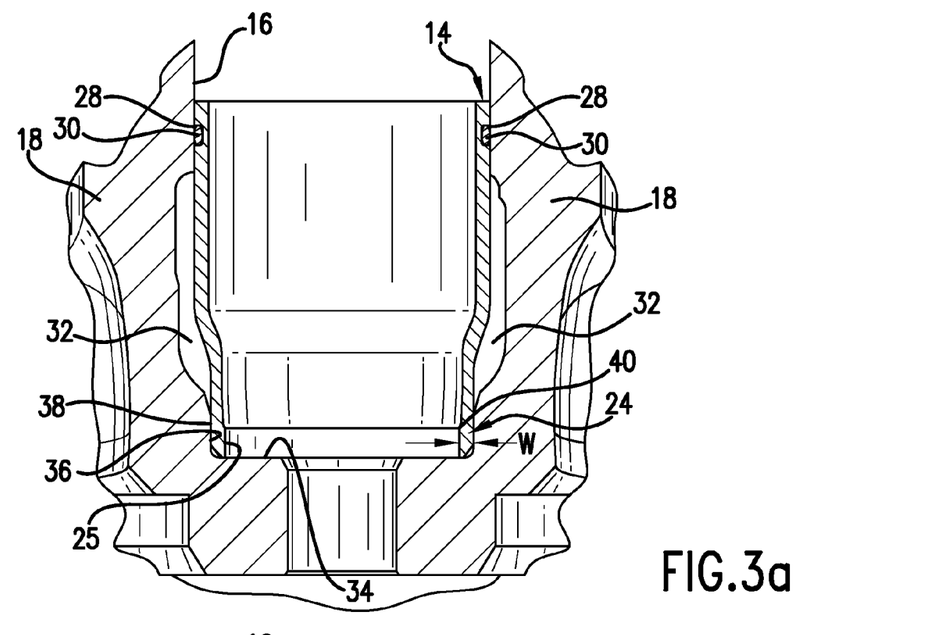
FIG. 3a is a cross-sectional view of the sealing sleeve inserted into position in an engine mounting bore.
Figure 4:
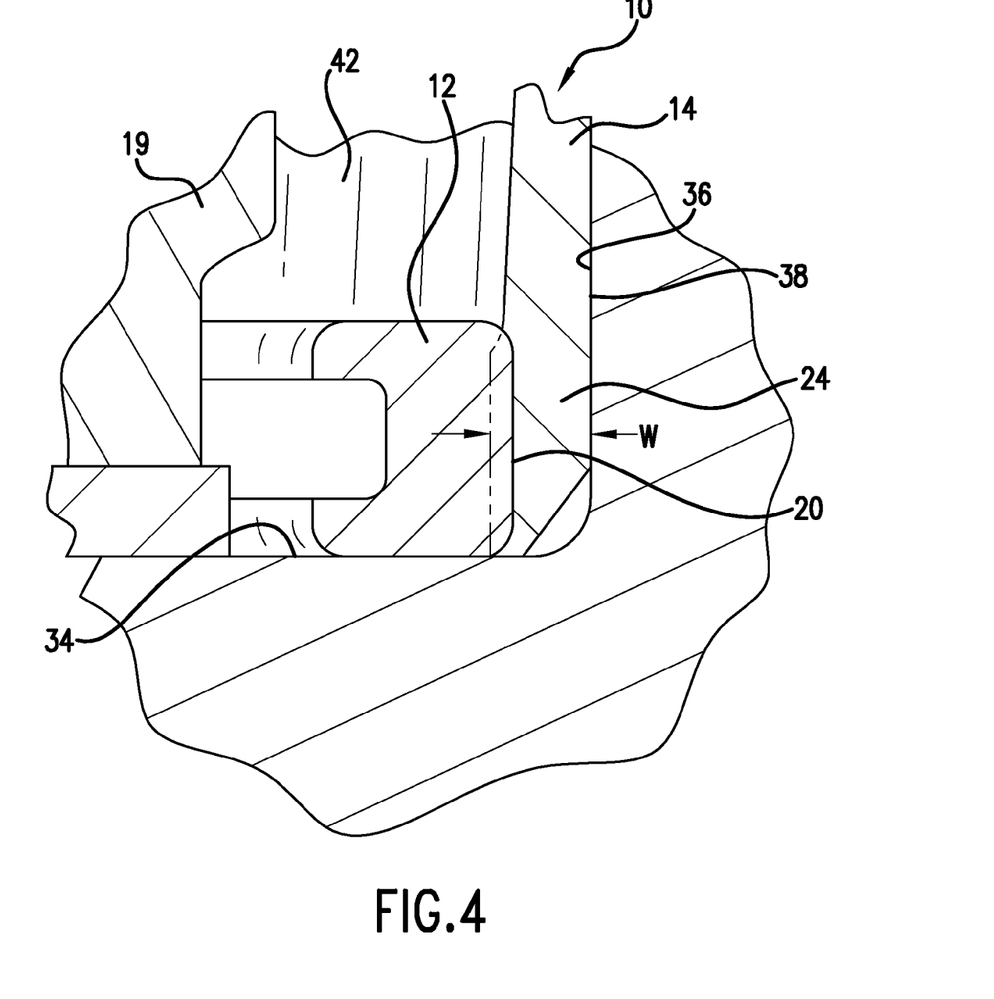
FIG. 4 is an enlarged cross-sectional view of a portion of the seal assembly installed as shown in FIG. 3d.

Referring to FIG. 2, sealing sleeve 14 is sized, dimensioned, and formed of an appropriate material, to be slip fit into place in engine component mounting bore 16 formed in cylinder head 18. Sealing sleeve 14 is generally cylindrical or tubular in shape and includes an inner end 22, an interface portion 24 formed at inner end 22, an outer end 26, and an annular groove 28 formed at outer end 26 for receiving a seal ring 30 (FIG. 3a). In other embodiments, annular groove 28 and seal ring 30 may be omitted or replaced with a series of shallow grooves to enhance plasticity of the sleeve outer surface. Whether or not the groove and seal ring are present, outer end 26 may be sealed by plastically rolling outer end 26 radially outward into the cylinder head wall forming the bore using an conventional rolling device. Sealing sleeve 14 is sized with an appropriate diameter along its length to create a close sliding fit with the portion of the engine, i.e. cylinder head, 18 forming bore 16. In the exemplary embodiment, the lower portion of the sleeve 14 has a smaller diameter than the upper portion. In other embodiments, sleeve 14 may be a simple cylinder. As best shown in FIGS. 3a and 4, interface portion 24 has a radial width or wall thickness W greater than an adjacent portion of the wall of sealing sleeve 14. Interface portion 24 includes an inner surface 25 having a radial extent less than, in a plane perpendicular to the longitudinal axis, an outer radial extent of outer annular surface 20 of retaining ring 12, or in other words, outer annular surface 20 has a greater radial extent than the inner radial extent of inner surface 25, to create an interference fit upon assembly. In the exemplary embodiment, the outer diameter of ring 12 is greater than the inner diameter of the interface portion 24 of sleeve 14 causing the retaining ring 12 to abut sleeve 14 during insertion and impart a radially outward force against interface portion 24 to cause interface portion 24 to bend or yield slightly radially outward into sealing abutment against cylinder head 18. Inner surface 25 of interface portion 24 may be formed on an inner land or protrusion 40. In the exemplary embodiment, land 40 extends continuously around the inner circumference of sleeve 14. However, in other embodiments, land 40 may extend around only a portion of the circumference, e.g., land 40 may be a plurality of spaced protrusions, so long as the sealing pressure is continuous and substantially uniform circumferentially.

Figure 3B:
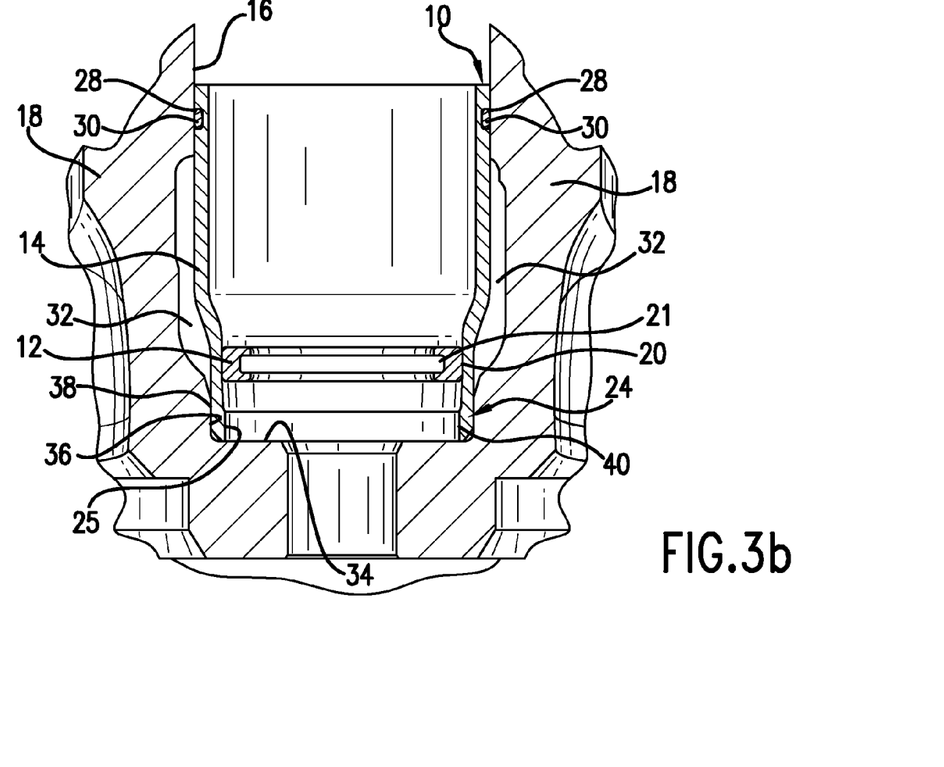
FIG. 3b is a cross-sectional view of the sealing sleeve in position in the mounting bore and the retaining ring being moved into position.
Figure 3C:
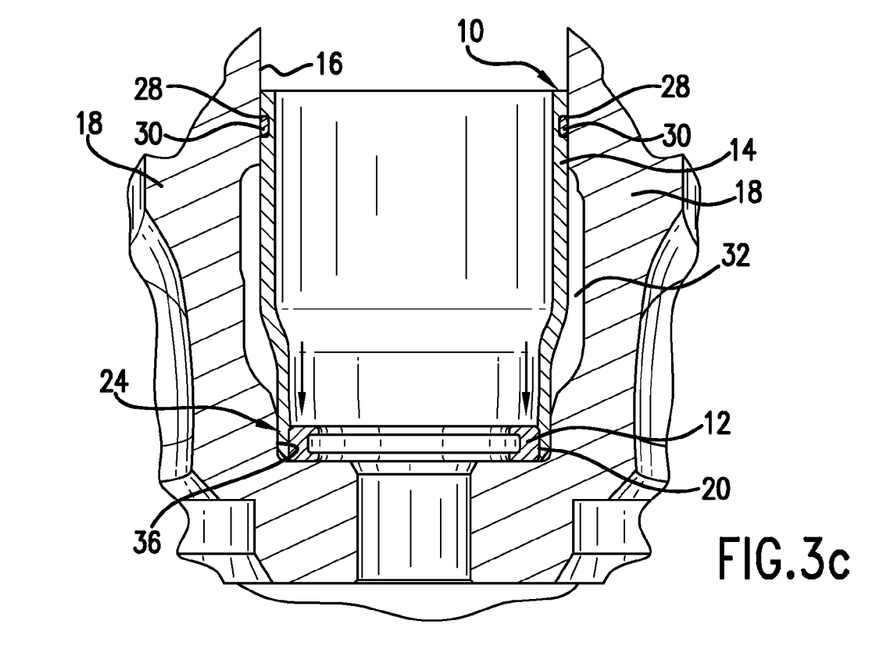
FIG. 3c is a cross-sectional view of the seal assembly installed in position in a mounting bore.

Referring to FIGS. 3a-3d and 4, sealing sleeve 14 is inserted into mounting bore 16 until inner end 22 abuts an annular bore land 34 formed on cylinder head 18 within mounting bore 16 and extending transverse to the longitudinal axis of mounting bore 16. Cylinder head 18 also includes a bore sealing surface 36 extending along the longitudinal axis of, and partially forming, mounting bore 16 and, in the exemplary embodiment, extends parallel to the longitudinal axis. Interface portion 24 includes an outer annular surface 38 positioned in close sliding relationship with bore sealing surface 36, without creating a complete fluid seal, when sealing sleeve 14 is inserted into bore 16 in the position shown in FIG. 3a prior to insertion of retaining ring 12. Retaining ring 12 is then inserted into mounting bore 16 and into sleeve 14 as shown in FIG. 3b. Ring 12 is pressed or forced to the bottom of mounting bore 16 into a seated position against bore land 34 by, for example, an insertion tool (not shown). The pressing action or downward force, shown as arrows A in FIG. 3c, axially downwardly on ring 12 causes ring 12 to impart an outwardly radial force or contact pressure on sealing sleeve 14 causing sleeve 14 to yield and move slightly outwardly. Interface portion 24 is not only moved slightly to close any existing tolerance gap but also is crushed or yields. FIG. 4 shows the inner surface 24 (land 40) as a dashed line as it was prior to expansion/yielding by ring 12. As a result, outer annular surface 38 of interface portion 24 sealingly contacts or abuts bore sealing surface 36 to create a continuous annular interface seal around the entire mounting bore 16. Outer surface 38 may include surface formations, such as very small grooves, to promote plasticity of the sleeve into sealing contract with bore sealing surface 36. The relative material hardness of the sealing sleeve 14 and retaining ring 12 at the seal region or interface, along with the interference fit, i.e. relative diameters of the inner surface of the sleeve and the outer surface of the ring, determines the yielding of the sleeve 14. The interface pressure at the seal between outer surface 38 of sleeve 14 and bore sealing surface 36 is controlled by both the amount or degree of interference between outer surface 20 of ring 12 and inner surface 25 of sleeve 14, and the initial "slip fit" gap or distance between outer surface 38 of sleeve 14 and bore sealing surface 36. The interference (INT) may be stated as follows:

$$INT=ID-OD-(2\times W)$$

Where: ID=Mounting bore 16 inner diameter at bore sealing surface 36; OD=Retaining ring 12 outer diameter; W=Radial wall thickness of sealing sleeve at sealing region.

Figure 3D:
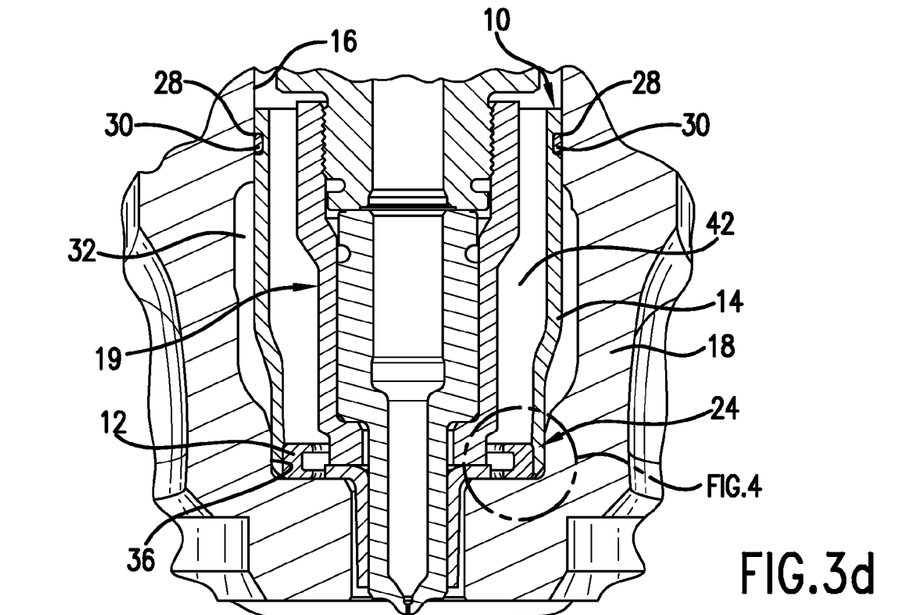
FIG. 3d is a cross-sectional view of the sealing assembly installed in position and an injector mounted in the mounting bore, with the sealing sleeve adjacent the retaining ring.

Lastly, as shown in FIG. 3d, fuel injector 19 is mounted in mounting bore 16 using any conventional mounting system. The mounting of the injector 19 creates an annular chamber 42, usually filled with fuel at low pressure. Sealing assembly 10 successfully and effectively fluidly separates chamber 42 from coolant passage 32 by the interference type annular lower seal and the upper seal provided by seal ring 30. Sealing assembly 10 does not rely on any mounting clamp load from the injector, or any force on ring 12 by the injector, to initiate the sealing effect of ring 12, and does not require a force from the injector or any other component to maintain the pressure on sleeve 14. Sealing assembly 10 does not require the injector to be present to maintain the coolant seal since the injector and retaining ring never come into contact with each other, i.e. remain a spaced distance from one another.

It should be noted that retaining ring 12 is left in place in bore 16, after insertion and expansion of the wall of sleeve 14 to maintain contact pressure on sleeve 14 so that sleeve 14 maintains sealing pressure against bore sealing surface 36 of cylinder head 18 throughout engine operation. Sealing assembly 10 and the sealing method offers the ability to use different materials for sleeve 14 and ring 12 to tailor the material requirements to the function of each part. Retaining ring 12 does not function as a sealing element. Instead, retaining ring 12 first mechanically expands the deformable sleeve material, and then is left in place during engine operation to maintain the contact pressure during the thermal expansion and contraction experienced during engine operation. The retaining ring material may have the same thermal expansion characteristics as the base cylinder head material to reduce the potential for leakage during engine operation. Thus, sealing sleeve 14 and retaining ring 12 may be formed of different materials to balance the requirements of sealing sleeve corrosion against seal and contact pressure limits during cyclic thermal events. Sealing sleeve 14 can be made of a corrosion resistant material, such as stainless steel, whereas retaining ring 12 can be made of a material having thermal growth or expansion characteristics comparable to, substantially the same as, or identical to, the base cylinder head material, such as low carbon steel.

Figure 5:
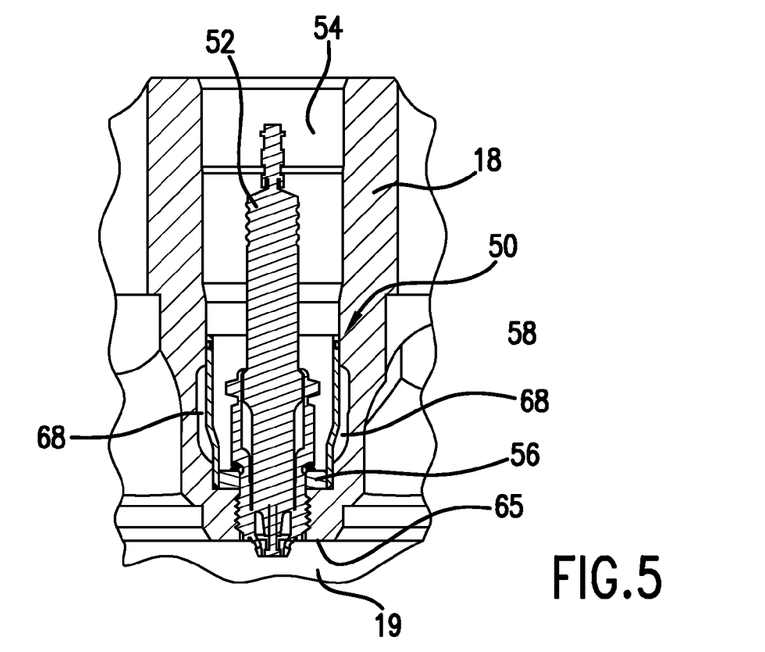
FIG. 5 is a cross-sectional view of another embodiment of the sealing assembly of the disclosure installed in position in an engine and a spark plug mounted in the mounting bore, with the sealing sleeve adjacent the retaining ring.
Figure 6:
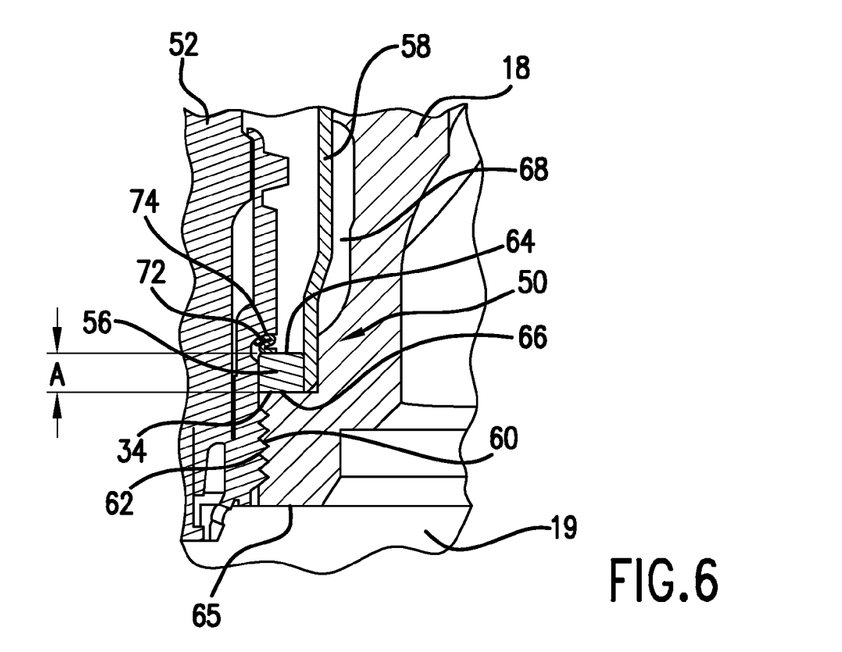
FIG. 6 is an enlarged cross-sectional view of a portion of the seal assembly installed as shown in FIG. 5.

FIGS. 5 and 6 show another exemplary embodiment including a spark plug seal assembly 50 for sealing and axially positioning a spark plug 52 in a spark plug mounting bore 54. Seal assembly 50 includes a retaining ring 56 and a sealing sleeve 58 which are the similar to the ring 12 and sleeve 14 described hereinabove except retaining ring 56 is used to axially position spark plug 52 in a desired axial position to optimize the ignition of fuel and air in a combustion chamber 19 by the spark from the spark plug. The detailed description of the seal assembly set forth previously relative FIGS. 1-3c and 4 equally applies to this embodiment and will not be repeated here for simplicity sake.

In the present exemplary embodiment, as shown in FIG. 6, spark plug mounting bore 54 includes internal threads 60 formed on an inner surface of cylinder head 18 for mating with complimentary threads 62 formed on the outer surface of a lower portion of spark plug 52. Retaining ring 56 includes a predetermined axial height or extent A having a predetermined length extending between a transverse upper surface 64 and a transverse lower surface 66 positioned in abutment against annular bore land 34 to axially position spark plug 52 in a desired axial position as discussed hereinbelow. It is known to position the distal end of a spark plug in a predetermined axial position in upper end of the combustion chamber 19, such as at a predetermined axial distance into combustion chamber 19 from a lower surface or combustion face 65 of cylinder head 18. This exemplary embodiment uses a single sealing assembly 50 to achieve the combination of two functions. The first function is to fluidly seal spark plug 52 from a coolant passage 68, and the second function is to provide the proper longitudinal or axial spacing of spark plug 52 relative to the lower surface 65 of cylinder head 18, i.e. the distance the distal end of spark plug 52 extends into combustion chamber 19.

As discussed hereinabove relative to the first embodiment, sealing sleeve 58 is dimensioned to have a slip fit with cylinder head 18, and retaining ring 56 is forced against annular bore land 34 in the spark plug mounting bore 54. As discussed above, the difference in radial dimensions causes sleeve 58 to be plastically deformed by ring 56 and sealingly forced against the inner surface of mounting bore 54 to seal the spark plug mounting bore 54 from coolant passage 68. The sleeve and ring material hardness and interference dimensions create the seal by controlling the interface pressure as discussed hereinabove.

Once seal assembly 50 is installed, spark plug 52 is inserted into bore 54, through the inner bore of ring 56, and rotated to cause external threads 62 to engage inner threads 60, formed on a connection portion of the cylinder head, to secure spark plug 52 to the cylinder head 18. The inner bore of ring 56 is sized larger than the outer diameter of the external threads 62 to permit unhindered passage of spark plug 52 through ring 56. The spacer function of retaining ring 56 provides the proper axial orientation of spark plug 52 relative to the lower face 65 of cylinder head 18. Retaining ring 56 includes a predetermined thickness or axial extent A so that once ring 56 is fully mounted in position in bore 54 to create the seal, and spark plug 52 is threaded into position in bore 54, spark plug 52 will necessarily be positioned in the desired axial position to locate the distal end of spark plug 52 in combustion chamber 19 in a predetermined desired position in combustion chamber 19. Of course, this device may be used for positioning the distal end of spark plug 52 in any desired axial position, such as in a prechamber or recess area in the cylinder head. The axial position of spark plug 52 can be adjusted by selecting a retaining ring with the appropriate axial extent A for a given engine and spark plug combination. A larger extent A results in less protrusion of the distal end of spark plug 52 into combustion chamber 19 (closer to the cylinder head lower surface 65), or a greater spaced recessed distance away from the surface 65 if the distal end is positioned in a prechamber or recess. A smaller extent A results in greater protrusion of the distal end of spark plug 52 into the combustion chamber 19 (farther from cylinder head lower surface 65), or a decreased recessed distance away from surface 65 if the distal end is positioned in a prechamber or recess. This embodiment permits changes to spark plug positioning, e.g. protrusion, with minimal or no changes to the cylinder head machining process. This design also avoids the need for separate distinct cylinder head castings typically required for diesel and natural gas engines to accommodate the thicker boss areas required at the spark plug location in natural gas engines. This design permits a common casting to be used for cylinder heads for both natural gas and diesel engines, with only different machining features thereby reducing costs.

An annular seal 72 may be provided between transverse upper surface 64 and an annular surface 74 formed on spark plug 52. Annular seal 72 is compressed axially upon installation of spark plug 52 to provide a fluid seal at this interface against the passage of fluids, such as combustion gases. Also, the transverse lower surface 66 of ring 56 may include a recess to accommodate a sealing element if needed. Of course ring 56 is intended to remain in the cylinder head and would not be removed during a typical service event, such as replacing spark plug 52.

Thus, sealing assemblies 10, 50 and the associated method avoids costly component features, costly tolerances, and costly process controls by letting material properties control the sealing interface pressure and by reducing the installation event to a simple mechanical press. Sealing assemblies 10, 50 and the associated methods offers a convenient, simple and cost effective way of achieving a secure, reliable, and complete annular fluid seal to ensure coolant is prevented from reaching fuel in an engine component mounting bore, while providing an effective way of cooling the cylinder head (combustion deck), injectors, and spark plugs to improve cylinder head robustness to cracking by reducing cylinder head temperatures, and improve injector and spark plug life, thereby reducing maintenance and downtime. A given spark-ignited fuel injected engine, operating on either diesel fuel or natural gas or both, may include both embodiments as discussed hereinabove.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. An engine component seal assembly for insertion in a mounting bore having a longitudinal axis formed in a portion of an engine, comprising:
    a sealing sleeve including an outer surface sized and dimensioned to be positionable in the mounting bore adjacent a bore sealing surface, said sealing sleeve further including an inner surface having an inner diameter at a ring interface portion; and
    a retaining ring sized and dimensioned to be positionable within said sealing sleeve adjacent said ring interface portion, said retaining ring having an outer annular surface with an outer diameter, wherein the outer diameter of the retaining ring is greater than the inner diameter of said sealing sleeve before the retaining ring is positioned within the sealing sleeve such that the outer annular surface of the retaining ring applies a radially outward sealing force against said interface portion to create a fluid seal between said sealing sleeve and the bore sealing surface when the retaining ring is positioned within the sealing sleeve.

2. The seal assembly of claim 1, wherein said outer surface of said sealing sleeve is sized and dimensioned to not form a fluid seal against said bore sealing surface without said radially outward sealing force.

3. The seal assembly of claim 1, wherein said sealing sleeve is formed of a first material and said retaining ring is formed of a second material different than said first material, said first material being resistant to corrosion.

4. The seal assembly of claim 1, wherein said second material has thermal expansion characteristics at least comparable to a material forming said portion of the engine.

5. The seal assembly of claim 1, wherein said outer surface of said sealing sleeve at said interface portion is devoid of one or more grooves.

6. The seal assembly of claim 1, wherein said sealing sleeve includes an annular groove formed in said outer surface and positioned at spaced axial distance from said interface portion, and further including a seal positioned in said annular groove.

7. The seal assembly of claim 1, wherein said interface portion has a radial width greater than a portion of said sealing sleeve adjacent said interface portion.

8. The seal assembly of claim 1, wherein said retaining ring includes a predetermined axial extent along the longitudinal axis to position the engine component in a predetermined axial position relative to the mounting bore.

9. A method of sealing a coolant passage from an engine component, comprising:
    providing an engine component mounting bore;
    providing a coolant passage in communication with said mounting bore;
    positioning a sealing sleeve in said mounting bore, the sealing sleeve having an inner surface having an inner diameter;
    positioning a retaining ring in said mounting bore and within said sealing sleeve at said inner surface, the retaining having an outer annular surface with an outer diameter that is greater than the inner diameter of the sealing sleeve;
    applying an axial force to said retaining ring prior to inserting an engine component into said mounting bore wherein the difference between the inner and outer diameters causes the outer annular surface of the retaining ring to expand the inner diameter of the sealing sleeve and apply a radial force against said sealing sleeve when the retaining ring is positioned within the sealing sleeve, and wherein the radial force causes said sealing sleeve to sealingly abut a sealing surface in said mounting bore to create a fluid seal between said sealing sleeve and said sealing surface to seal a portion of said coolant passage from said mounting bore; and
    inserting the engine component into said mounting bore and said sealing sleeve while
    maintaining said retaining ring in said sealing sleeve.

10. The method of claim 9, wherein said sealing sleeve is formed of a first material and said retaining ring is formed of a second material different than said first material, said first material being resistant to corrosion.

11. The method of claim 10, wherein said second material has thermal expansion characteristics at least comparable to a material forming said wall.

12. The method of claim 9, wherein said engine component is a spark plug.

13. The method of claim 12, wherein said retaining ring includes a predetermined axial extent along the longitudinal axis to position the spark plug in a predetermined axial position relative to the mounting bore.

14. The method of claim 9, wherein said sealing sleeve includes an interface portion having an outer surface to sealingly abut said sealing surface, said positioning of said sealing sleeve in said mounting bore not forming a fluid seal between said outer surface of said interface portion and said sealing surface.

15. An engine, comprising:
an engine body including a spark plug mounting bore including a longitudinal axis and a sealing surface;
a sealing sleeve positioned in said mounting bore, the sealing sleeve having an inner diameter;
a retaining ring mounted in said sealing sleeve, said retaining ring having an outer diameter that is greater than the inner diameter of the sealing sleeve before the retaining ring is mounted in the sealing sleeve, the retaining ring sized to apply a radially outward sealing force against said sealing sleeve to create a fluid seal between said sealing sleeve and said sealing surface when the retaining ring is mounted in the sealing sleeve, the radially outward sealing force being applied based on the difference between the inner and outer diameters when the retaining ring is mounted in the sealing sleeve; and
a spark plug mounted in said mounting bore adjacent said retaining ring.

16. The engine of claim 15, wherein said sealing sleeve includes an inner sleeve surface having an inner radial extent, said retaining ring having an outer ring surface with an outer radial extent greater than said inner radial extent of said inner sleeve surface of said sealing sleeve to create an interference fit.

17. The engine of claim 15, wherein said sealing sleeve is formed of a first material and said retaining ring is formed of a second material different than said first material, said first material being resistant to corrosion.

18. The engine of claim 15, wherein said retaining ring includes a predetermined axial extent along the longitudinal axis to position the spark plug in a predetermined axial position relative to the mounting bore.

19. The engine of claim 15, wherein the engine further includes a coolant passage in communication with said mounting bore, and an annular seal positioned between said sealing sleeve and the sealing surface, said sealing sleeve including an interface portion in contact with said retaining ring, said coolant passage positioned axially along said spark plug between said interface portion and said annular seal.

20. The engine of claim 15, wherein said sealing sleeve includes an interface portion in contact with said retaining ring, said interface portion having a radial width greater than a portion of said sealing sleeve adjacent said interface portion.

21. The engine of claim 15, wherein the engine further includes a coolant passage in communication with said mounting bore, said fluid seal fluidically sealing a portion of said coolant passage from said mounting bore.

22. The engine of claim 15, wherein said retaining ring includes a center bore to receive the spark plug and an inner surface positioned adjacent the spark plug, said inner surface including a radial extent sized to permit the spark plug to be slidingly received within said center bore without forming a fluid seal between the inner surface and the spark plug.

23. The engine of claim 15, wherein said engine body further includes a connection portion formed adjacent to and extending around said mounting bore, said spark plug including a securing portion positioned to engage said connection portion to secure the spark plug in said mounting bore, said connection portion positioned axially between a distal end of said spark plug and said retaining ring.

24. An engine component seal assembly for insertion in a mounting bore having a longitudinal axis formed in a portion of an engine, comprising:
a sealing sleeve including an outer surface positionable in the mounting bore adjacent a bore sealing surface, the sealing sleeve further including an inner surface and a ring interface portion, the inner surface at the interface portion having an inner radial extent; and
a retaining ring positionable within the sleeve adjacent the ring interface portion, the retaining ring having an outer annular surface including, in a plane perpendicular to the longitudinal axis, an outer radial extent that is greater than the inner radial extent of the inner surface of the ring interface portion to apply a radially outward sealing force against the interface portion wherein the direction of the sealing force is perpendicular to the inner surface of the sealing sleeve, thereby creating a fluid seal between the sealing sleeve and the bore sealing surface, the retaining ring having an annular groove formed on the inner surface of the retaining ring, wherein the annular groove is adapted to receive a tool to facilitate removal of the retaining ring from within the sealing sleeve;
wherein the inner surface at the ring interface portion is in a plane perpendicular to the longitudinal axis.

* * * * *